United States Patent
Urbanek

(10) Patent No.: US 7,590,430 B1
(45) Date of Patent: Sep. 15, 2009

(54) ARCHITECTURE AND APPLICATIONS TO SUPPORT DEVICE-DRIVEN FIRMWARE UPGRADES AND CONFIGURABLE MENUS

(75) Inventor: Robert E. Urbanek, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 740 days.

(21) Appl. No.: 10/978,708

(22) Filed: Nov. 1, 2004

(51) Int. Cl.
*H04M 1/00* (2006.01)

(52) U.S. Cl. ............... 455/566; 455/412.1; 455/414.1; 345/168; 345/169; 379/433.01; 379/433.04

(58) Field of Classification Search ............... 455/557, 455/456.6, 566, 412.1, 412.2, 575.1, 422, 455/403, 550.1, 90.3, 414.1, 418–420, 1, 455/425; 379/433.01, 433.04, 355.02; 345/168–169, 345/173
See application file for complete search history.

(56) References Cited

U.S. PATENT DOCUMENTS

| | | | | | |
|---|---|---|---|---|---|
| 6,144,863 | A * | 11/2000 | Charron | ...................... | 455/566 |
| 6,804,537 | B1 * | 10/2004 | Fujii | .......................... | 455/557 |
| 6,993,362 | B1 * | 1/2006 | Aberg | ........................ | 455/566 |
| 7,132,973 | B2 * | 11/2006 | Jindal | .......................... | 341/176 |
| 7,243,307 | B2 * | 7/2007 | Gao et al. | ..................... | 715/744 |
| 7,308,288 | B2 * | 12/2007 | Pasquale et al. | ............. | 455/566 |
| 2003/0134648 | A1 * | 7/2003 | Reed et al. | ................... | 455/456 |
| 2005/0054381 | A1 * | 3/2005 | Lee et al. | ..................... | 455/557 |
| 2005/0250549 | A1 * | 11/2005 | Watanabe et al. | ........... | 455/566 |
| 2006/0084477 | A1 * | 4/2006 | Wardimon et al. | .......... | 455/566 |
| 2006/0148522 | A1 * | 7/2006 | Chipchase et al. | .......... | 455/557 |

* cited by examiner

*Primary Examiner*—Pablo N Tran

(57) ABSTRACT

A system is provided for allowing customization of a menu structure of a mobile telecommunications device whose menu structure is managed by firmware. The system includes static and editable menu configuration files. The static menu configuration file includes information related to static menus for the device. The editable menu configuration file contains a customizable set of menu parameters related to customized menus for the device. The system also includes first and second pointers. The first pointer points to the static menu configuration file. The first pointer promotes loading static menus by the device based on the static menu configuration file. The second pointer points to the editable menu configuration file. The second pointer promotes loading customized menus by the device based on the editable menu configuration file. The system also includes an application loaded on the device that allows for editing of the editable menu configuration file.

24 Claims, 3 Drawing Sheets

ARCHITECTURE AND APPLICATIONS TO SUPPORT DEVICE-DRIVEN FIRMWARE UPGRADES AND CONFIGURABLE MENUS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the modification of the graphical user interfaces provided by mobile telecommunications devices. More particularly, embodiments of the present invention allow a user to customize the menu structures of some mobile telecommunications devices.

BACKGROUND OF THE INVENTION

As mobile telecommunications devices have become more sophisticated, the number of functions and applications accessible by the devices has increased. Many of the devices offer a graphical user interface containing a multi-tiered menu structure that allows users to select these functions and applications. A user can navigate through the menu structure by selecting a top-level menu item and then making successive selections among the entries in any number of sub-menus until arriving at an entry that launches a desired function or application.

Some devices use an operating system, such as Windows CE or Palm OS, that is designed specifically for handheld devices. In such devices, the operating system might manage the native menu structure of the device. For example, the operating system might offer the user the capability of dynamically making additions, deletions, or other modifications to the menus displayed by the device.

In devices without operating systems such as these, the menu structure might be provided as firmware that is hard-coded into the device at the time of initial setup. When the menu structure is managed by firmware, static menu modifications might be possible but the menus typically cannot be manipulated dynamically. That is, changes to the menu structure typically require an upgrade of the entire set of firmware on the device. For example, the device might be brought into a retail store where a firmware upgrade can be done. In some cases, firmware upgrades can also be made over the air via a wireless Internet connection or other wireless data transmission means. In either case, the changes to the menu structure are static and cannot be made directly by a user in real time.

The firmware on a mobile telecommunications device typically contains multiple configuration files that specify various operating parameters for the device. For example, one configuration file might contain sound settings, another configuration file might contain Internet connection settings, etc. The menu structure for a device and the locations of applications and functions listed in the menu are also typically maintained in a configuration file. When a device is turned on, pointers in the firmware point to the various configuration files and cause the parameters specified in the configuration files to be loaded into the device. When a pointer points to the configuration file for the device's menu structure, the menu is retrieved and displayed on the device's graphical user interface.

When modifications are to be made to a device's menu structure through a static firmware upgrade, the new menu configuration information is typically transmitted to a new directory or new configuration file within the device firmware. A validation can then be performed to ensure that the configuration data was successfully delivered into the directory or configuration file. The configuration information is placed in a new directory or a new configuration file rather than overwriting the old configuration file so that if a transmission failure occurs, the old configuration file is not lost.

If the transmission is successful, the pointer to the menu structure is changed to point to the directory or configuration file containing the new menu configuration information. Thereafter, the new menu structure will be retrieved and displayed when the device is turned on.

FIG. 1 illustrates the above described process for modifying the menus of a device where the menu structure of the device is managed by firmware rather than by an operating system. A mobile telecommunications device 5 contains firmware 10 and a graphical user interface 90. The firmware 10 contains a set of pointers 20 and various configuration files for the device. Before the menu modification is made, three configuration files 30, 40, and 50 are shown provided on the firmware 10. In this case configuration file 50 holds the settings for the menu structure of the device. That is, the items listed in the device's menus, the nesting structure of those items, and the locations of the files to which those items refer are all contained in configuration file 50.

When the device is turned on, a startup sequence calls the pointers in the set of pointers 20. This causes the parameters in the configuration files 30, 40, and 50 to be loaded into the active memory of the device 5. In particular, pointer 55 causes the menu structure in configuration file 50 to be sent, via path 95, to the graphical user interface 90 where the menus are then displayed.

When a change in the menu structure of the device 5 is desired, a new configuration file 60 is added. The new menu parameters are transmitted to configuration file 60 and the transmission is validated. Upon validation, the pointer 55 that previously pointed to configuration file 50 is adjusted to point to configuration file 60. Thereafter, pointer 55 will cause the menu structure in configuration file 60 to be sent, via path 105, to the graphical user interface 90 where the modified menus will then be displayed. The addition of configuration file 60 and the adjustment of pointer 55 to point to configuration file 60 instead of configuration file 50 typically requires that an update of the entire set of firmware 10 on the device 5 be performed.

Changes made to the menu configuration files in this manner are static. That is, the menu configuration files cannot be changed directly by the user or by applications on the device. If further changes are to be made, the process of delivering a new configuration file, validating the delivery, and changing the pointer to point to the new configuration file must be repeated.

SUMMARY OF THE INVENTION

An embodiment of the invention is a system for allowing customization of a menu structure of a mobile telecommunications device whose menu structure is managed by firmware. The system includes both static and editable menu configuration files. The static menu configuration file includes information related to static menus for the device. The editable menu configuration file contains a customizable set of menu parameters related to customized menus for the device. The system also includes first and second pointers. The first pointer points to the static menu configuration file. The first pointer promotes loading static menus by the device based on the static menu configuration file. The second pointer points to the editable menu configuration file. The second pointer promotes loading customized menus by the device based on the editable menu configuration file. The system also includes an application loaded on the device that allows for editing of the editable menu configuration file.

An alternative embodiment provides a method for enabling customization of a menu structure of a mobile telecommunications device whose menu structure is managed by firmware. The method includes providing an editable menu configuration file to the mobile telecommunications device, the editable menu configuration file having customizable menu information. The method includes pointing a pointer to the editable menu configuration file provided to the mobile telecommunications device. The method provides for loading menus into a graphical user interface of the mobile telecommunications device, at least some of the menus based on the editable configuration file. The method also provides for installing an application on the mobile telecommunications device. The application is operable for a user to edit the customizable menu information in the editable menu configuration file to modify at least some of the menus of the mobile telecommunications device.

In another embodiment, a mobile telephony device is provided that allows for customization of a menu structure of the mobile telephony device whose menu structure is managed by firmware. The mobile telephony device includes a static and editable menu configuration files. The static menu configuration file includes information related to static menus for the mobile telephony device. The editable menu configuration file contains a customizable set of menu parameters related to customized menus for the mobile telephony device. The device includes first and second pointers. The first pointer points to the static menu configuration file to promote loading static menus by the mobile telecommunications device based on the static menu configuration file. The second pointer points to the editable menu configuration file to promote loading customized menus by the mobile telephony device based on the editable menu configuration file. The device includes firmware to maintain at least the static menu configuration file and the first and second pointers. The device also includes an application for editing of the editable menu configuration file.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

Figure 1:
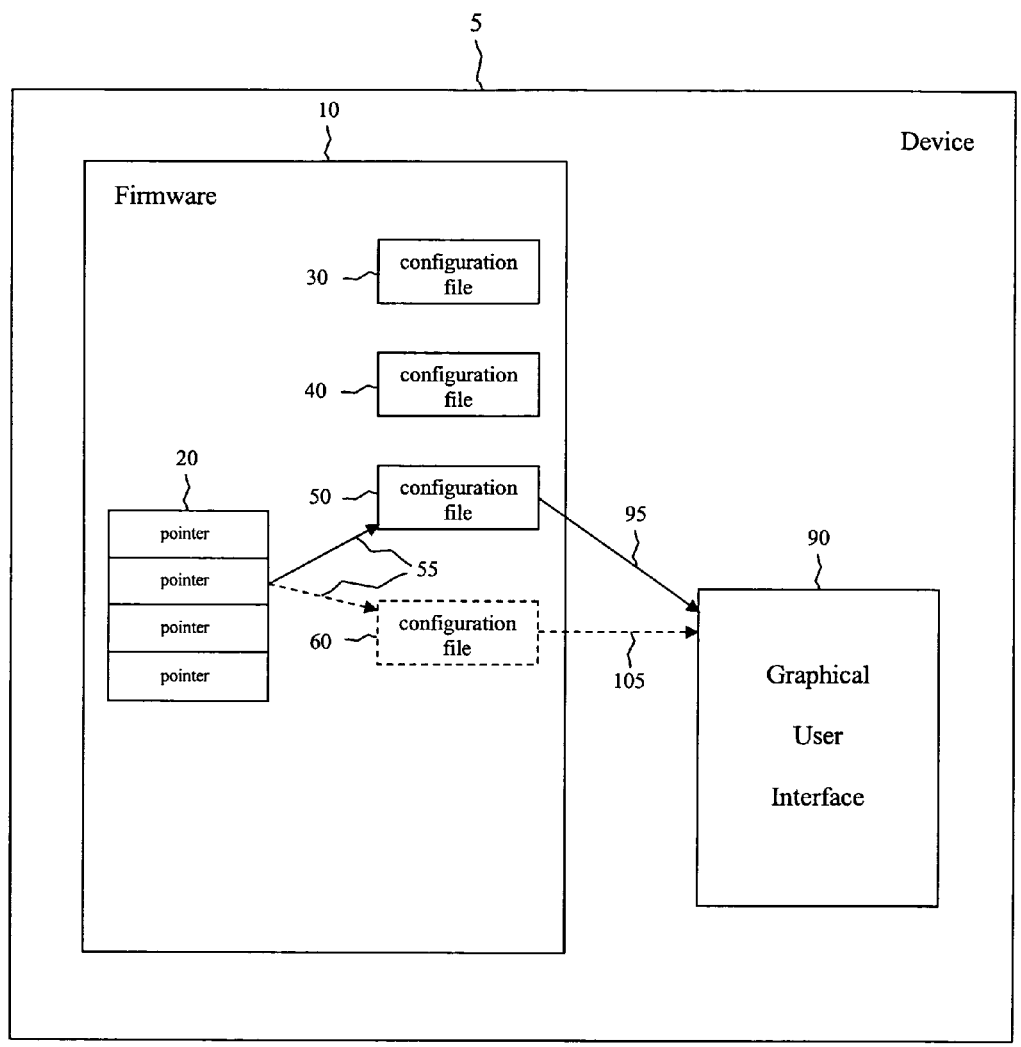
FIG. 1 is a block diagram of components involved in a firmware upgrade according to the prior art.

It should be understood at the outset that although an exemplary implementation of one embodiment is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Embodiments of the present invention allow modifications to be made dynamically to the menu structure of a mobile telecommunications device whose menu parameters are managed by the firmware within the device. As used herein the term mobile device, mobile communication or telecommunications device, may include mobile and wireless telephones, personal digital assistants (PDA), or other telecommunication devices. This typically includes devices that have an application environment such as a Java Virtual Machine on the device but that do not have a native operating system like Windows CE or Palm OS hosting that environment.

Dynamic customization of menus can provide users with easier navigation through the menu structure. For example, if large numbers of applications and functions are added to the standard, static menu structure traditionally displayed by a mobile telecommunications device, a user may need to navigate through several layers of sub-menus to reach a desired application or function. With dynamic customization, the user can organize the menu structure so that frequently used applications and functions can be reached more easily. Dynamic customization allows the user to add to, delete from, and reorganize the menu structure of the mobile telecommunications device in real time directly on the device. There is no need for large-scale upgrades to the device firmware each time a menu modification is made.

The standard, static menu structure that is typically displayed by a mobile telecommunications device and that gives access to basic functions (e.g., web browser, instant messaging, settings) is retained and can be modified in the manner described above. In addition, the ability to add and edit a set of supplementary, customizable menus is provided. A change is made to the firmware so that the standard, static menu items are created based on a static set of parameters and then a user-modifiable directory is read to retrieve the customized menus. When the device is turned on, both the standard menus and the customized menus are displayed.

The customizable menus are created by an additional configuration file that specifies the applications and functions to be listed in those menus and the locations of those items. A one-time firmware upgrade is done to place this file in the device firmware. Thereafter, the file can be directly modified through the device's graphical user interface as often as desired by the user. There is no need for further firmware upgrades to make further changes to the customizable menu. A portion of the menu structure is thus made dynamic. The editable configuration file may be deployed on the firmware, or placed in other locations on the device such as in storage or memory.

An additional pointer that points to the customizable menu configuration file is added to the set of pointers already present in the device's firmware that point to the file for the standard, static menu, the file for sounds, the file for Internet connection parameters, etc. When the device is turned on, the pointer to the standard, static menu configuration file causes that menu to be displayed and the pointer to the customizable menu configuration file causes that menu to be displayed. The result is a graphical user interface that displays a set of standard menu items and an additional set of customizable menu items.

When the customizable menu configuration file and the pointer to that file are added to the firmware, an application may also be added that gives the user the capability of editing the customizable menu configuration file. The application displays an interface on the device that allows items in the customized menus to be added, deleted, renamed, reorganized, or point to different applications or processes to launch, for example. Items can also be moved or copied from the standard, static menu. When the user modifies a menu item in the interface, the application makes the appropriate changes to the customizable menu configuration file and the modified item is subsequently displayed in the graphical user interface.

Figure 2:
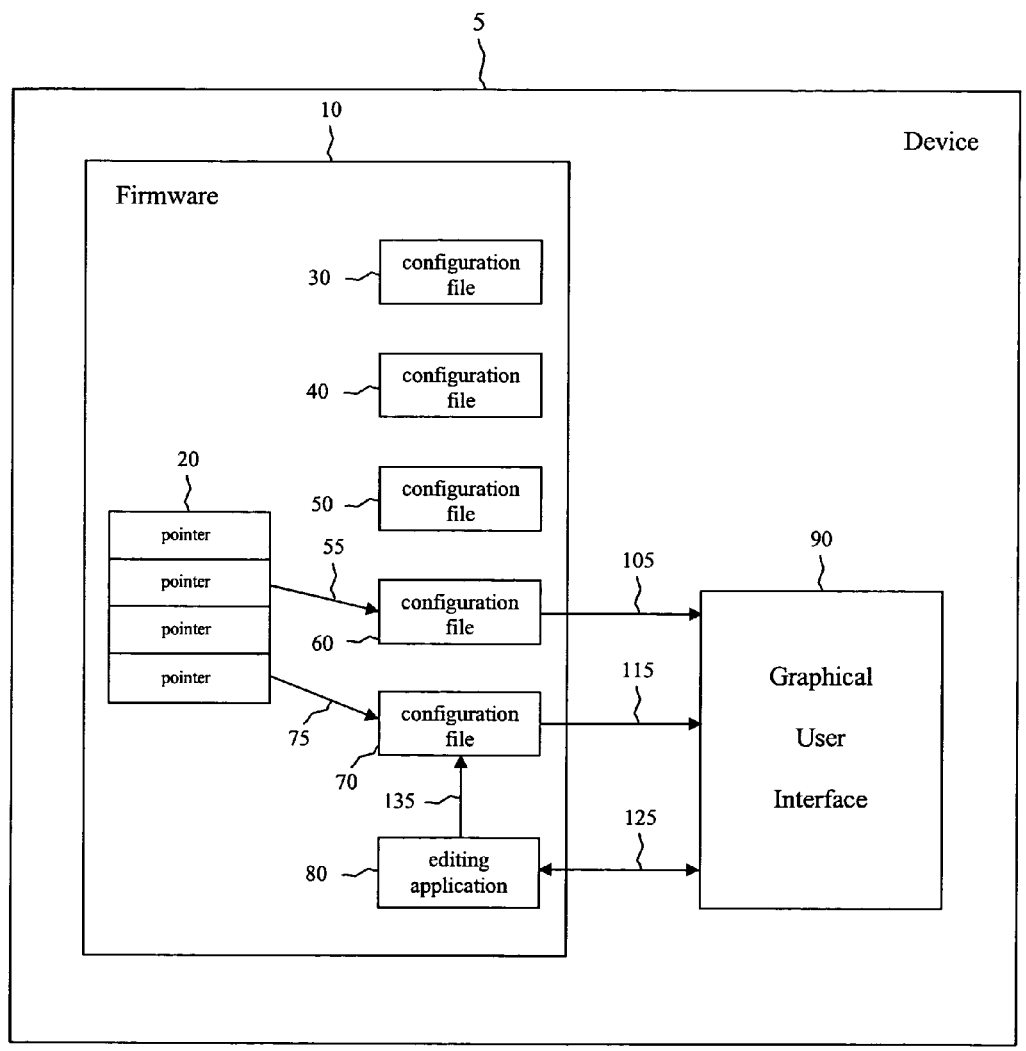
FIG. 2 is a block diagram of components involved in dynamic menu customization in an embodiment of the present disclosure.

FIG. 2 illustrates components in the mobile telecommunications device 5 where the menu structure of the device is managed by firmware rather than by an operating system and where the menus of the device can be modified dynamically. Pointer 55 points to the configuration file 60 for the standard, static menu structure. A new configuration file 70 has been added that contains the customizable menu structure. The customizable menu structure may, however, be contained in any of the configuration files 30, 40, 50, and 60. Each configuration file 70 may also contain settings for various operating parameters of the device 5, such as sound settings and Internet connection parameters. A new pointer 75 is provided that points to this new configuration file 70. When the device 5 is turned on, pointer 55 causes the standard, static menu to be loaded into the graphical user interface 90 via path 105 and pointer 75 causes the customized menu to be loaded into the graphical user interface 90 via path 115.

A user can use the graphical user interface 90 on a display (not shown) of the device 5 to interact, via path 125, with an editing application 80 on the device. The editing application 80, via path 135, allows the user to make changes to the configuration file 70. A single firmware upgrade is made to add the configuration file 70, the pointer 75, and the editing application 80. Thereafter, the editable configuration file 70 and the editing application 80 allow the user to make changes to the customizable menus without the need for further firmware modifications.

Figure 3:
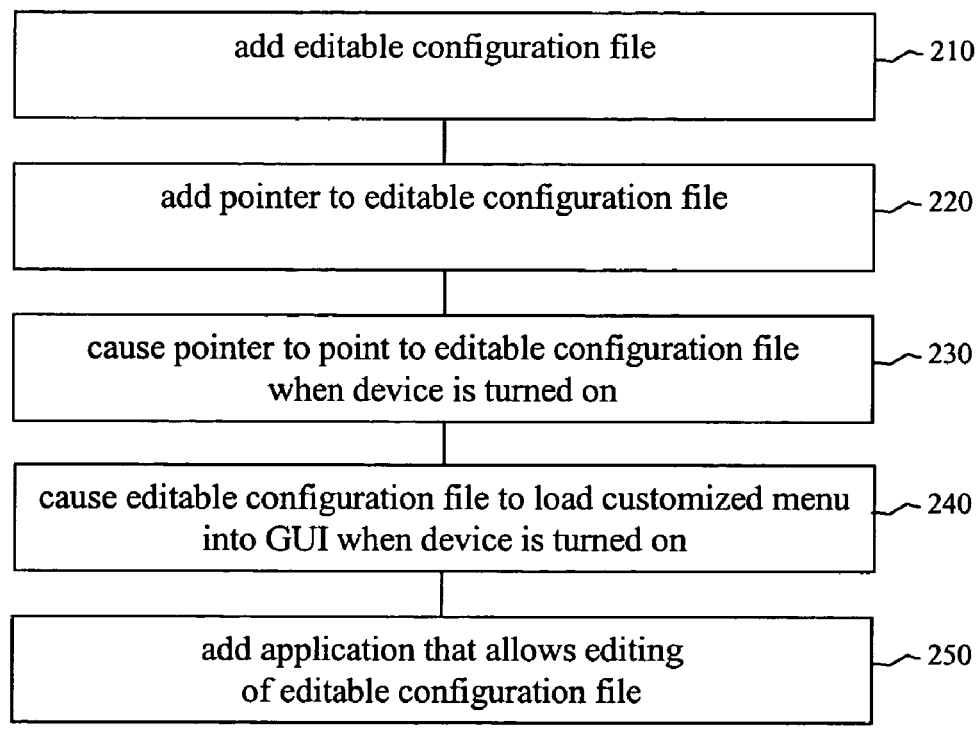
FIG. 3 is a flowchart of a method for enabling the dynamic customization of a menu in an embodiment of the present disclosure.

A method for enabling dynamic customization of the menu structure of a mobile telecommunications device whose menu structure is managed by firmware is shown in FIG. 3. In box 210, an editable configuration file is added to the device. The configuration file, as previously discussed, may be added via a wireless or wired connection. In box 220, a pointer that points to the editable configuration file is added to the device. The pointer may be encoded or otherwise provided, for example, as part of a set-up or installation program enabling the customizable menus on the device 5. In box 230, the pointer is caused to point to the editable configuration file at least when the device is turned on. In box 240, the pointing of the pointer to the editable configuration file causes the editable configuration file to load a set of customized menus into the device's graphical user interface when the device is turned on. The customized menus may add to the standard or existing menus, or in some embodiments, the customized menus may overwrite or replace some or all of the standard or existing menus. In box 250, an editing application that allows modification of the editable configuration file is added to the device. In some embodiments, the editing application resides on a provider server, for example, and is accessed wirelessly from the device 5. In this embodiment, the editing application wirelessly edits and/or updates the configuration file on the device 5.

In addition to the menu customization that a user can perform manually, it is possible for some applications to make automated changes to the customizable menus. That is, an application that is downloaded to a device 5 might have the capability to communicate with the editing application 80. The downloaded application could automatically send appropriate inputs to the editing application 80, which in turn could edit the configuration file 70 so that a menu item for the downloaded application appears in a customized menu.

Also, while the discussion thus far has focused on the customizing of menus, one of skill in the art will recognize that systems and methods such as those described above could be used for making other modifications to the settings of a mobile telecommunications device. As an example, a standard, static configuration file in a device might contain settings for a wireless Internet connection. An editable file with an additional set of settings and a pointer to the editable file could be added to the device in the manner described above. If a connection to the Internet cannot be made with the standard settings, the editable file could be called and new or modified settings can be added and an attempt at connection could be made with those new or modified settings. Once the editable file and the pointer to the editable file have been added to the device's firmware, a user could be given the capability of editing the editable file without the need for further firmware modifications.

While several embodiments have been provided in the present disclosure, it should be understood that the Architecture and Applications to Support Device-Driven Firmware Upgrades and/or Service Upgrades may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for allowing customization of a menu structure of a mobile telecommunications device, the system comprising:

a firmware that manages the menu structures of the mobile telecommunications device;

a static menu configuration file that includes information related to at least one static menu for the mobile telecommunications device;

an editable menu configuration file that contains a customizable set of menu parameters related to at least one customized menu for the mobile telecommunications device;

a first pointer that points to the static menu configuration file and promotes loading the at least one static menu by the mobile telecommunications device based on the static menu configuration file;

a second pointer that points to the editable menu configuration file and promotes loading the at least one customized menu by the mobile telecommunications device based on the editable menu configuration file;

an application loaded on the mobile telecommunications device, wherein the application enables editing of the editable menu configuration file; and a display of the mobile telecommunications device and a graphical user interface associated with the display, wherein the graphical user interface displays a combination menu based on the first pointer that points to the static menu configuration file and the second pointer that points to the editable menu configuration file, wherein the combination menu includes a combination of both the at least one static menu and the at least one customizable menu.

2. The system of claim 1, wherein the application enables a user to modify the at least one customized menu by the user editing the edit editable menu configuration file using the application.

3. The system of claim 1, wherein the at least one customized menu is loaded from the editable menu configuration file after the at least one static menu is loaded from the static menu configuration file.

4. The system of claim 1, further comprising a plurality of pointers on the mobile telecommunications device and wherein the second pointer is added to the plurality of pointers.

5. The system of claim 1, further including a processor to load the at least one static menu based on the first pointer and to load the at least one customizable menu based on the second pointer.

6. The system of claim 1, wherein the application includes an add function, a delete function, and modify function for adding, deleting, and modifying, respectively, menu items of the at least one customizable menu.

7. The system of claim 6, wherein the application further enables a user to selectively associate other applications to process associated with menu items of the customizable menu.

8. The system of claim 6, wherein the application further enables the user to organize menu hierarchies.

9. The system of claim 1, wherein the application is accessible through the graphical user interface of the mobile telecommunications device.

10. A method for enabling customization of a menu structure of a mobile telecommunications device whose menu structure is managed by firmware, the method comprising;

providing an editable menu configuration file to the mobile telecommunications device, the editable menu configuration file having customizable menu information;

pointing a first pointer to the editable menu configuration file provided to the mobile telecommunications device;

loading at least one customizable menu into a graphical user interface of the mobile telecommunications device, wherein the at least one customizable menu is based on the editable configuration file;

installing an application on the mobile telecommunications device, wherein the application enables a user to edit the customizable menu information in the editable menu configuration file to modify the at least one customizable menu of the mobile telecommunications device; and displaying, via the graphical user interface, a combination menu based on the first pointer that points to the editable menu configuration file and a second pointer that points to a static menu configuration file, wherein the combination menu includes a combination of both the at least one customizable menu and at least one static menu managed by the firmware.

11. The method of claim 10, wherein the application is accessible through the graphical user interface of the mobile telecommunications device.

12. The method of claim 10, wherein the mobile telecommunications device does not natively support user customizable menus.

13. The method of claim 10, wherein the mobile telecommunication device is a wireless telephone.

14. The method of claim 10, further comprising loading the at least one static menu into the graphical user interface based on a static menu configuration file.

15. The method of claim 14, wherein the at least one static menu based on the static menu configuration file is loaded into the graphical user interface before the at least one customizable menu based on the editable menu configuration file is loaded into the graphical user interface.

16. A mobile communication device for allowing customization of a menu structure of the mobile communication device whose menu structure is managed by firmware, the mobile communication device comprising:

a static menu configuration file that includes information related to at least one static menu for the mobile communication device;

an editable menu configuration file that contains a customizable set of menu parameters related to at least one customized menu for the mobile communication device;

a first pointer that points to the static menu configuration file and promotes loading the at least one static menu by the mobile telecommunications device based on the static menu configuration file;

a second pointer that points to the editable menu configuration file and promotes loading the at least one customized menu by the mobile communication device based on the editable menu configuration file;

firmware that maintains at least the static menu configuration file and the first and second pointers;

an application that enables editing of the editable menu configuration file; and a display of the mobile telecommunications device and a graphical user interface associated with the display, wherein the graphical user interface displays a combination menu based on the first pointer that points to the static menu configuration file and the second pointer that points to the editable menu configuration file, wherein the combination menu includes a combination of both the at least one static menu and the at least one customizable menu.

17. The mobile communication device of claim 16, wherein the editable menu configuration file is maintained by the firmware.

18. The mobile communication device of claim 16, wherein the editable menu configuration file is stored on a storage device of the mobile communication device.

19. The mobile communication device of claim 16, wherein the application is loaded on the mobile communication device.

20. The mobile communication device of claim 16, wherein the application is provided on a remote computer system and wherein the mobile communication device communicates with application to enable a user to edit the editable menu configuration file to modify the customized menu.

21. The mobile communication device of claim 16, wherein the application is inoperable for editing the static menu configuration file.

22. The mobile communication device of claim 16, wherein the editable menu configuration file is contained in the static menu configuration file.

23. The mobile communication device of claim 16, wherein the at least one customizable menu overwrites at least a portion of the at least one static menu.

24. The system of claim 1, wherein the combination of both the at least one static menu and the at least one customizable menu is based on at least one of adding the at least one customizable menu to the at least one static menu, overwriting the at least one customizable menu over a part of the at least one static menu, and replacing a portion of the at least one static menu with the at least one customizable menu.

* * * * *